Figure 3:
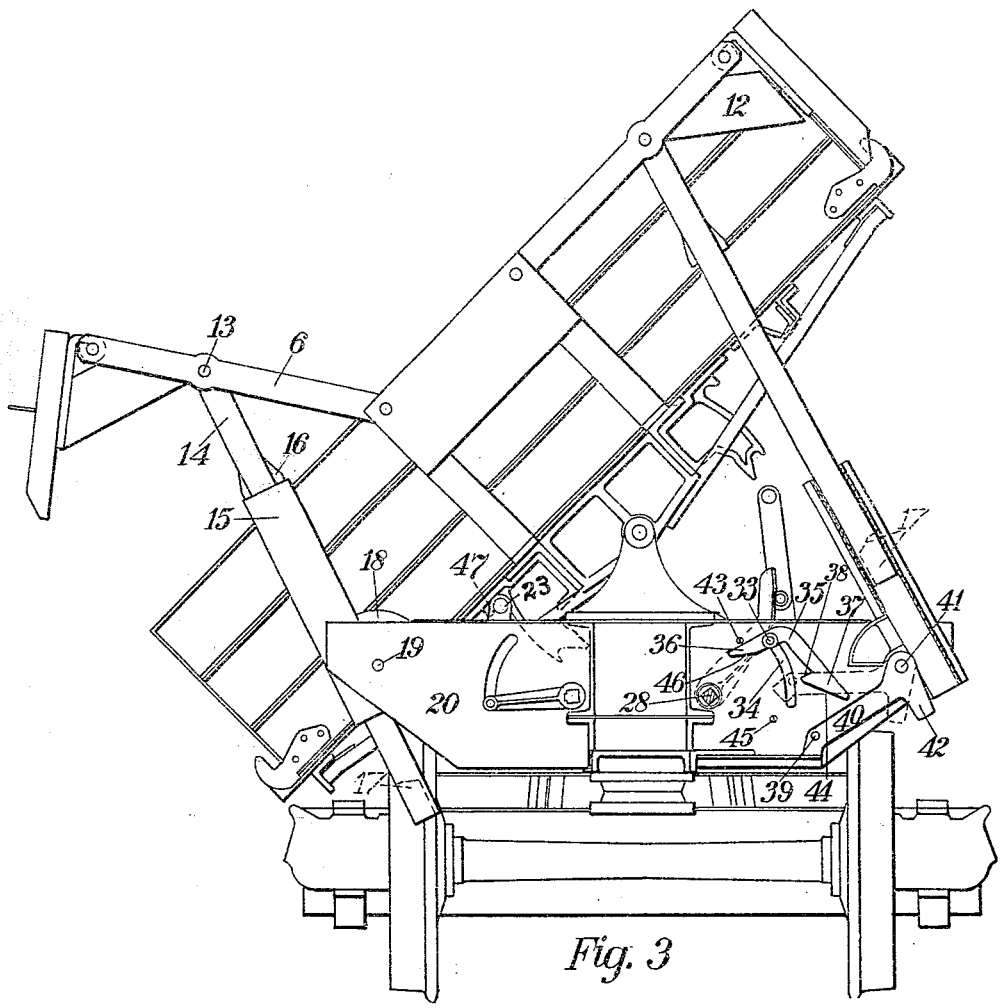

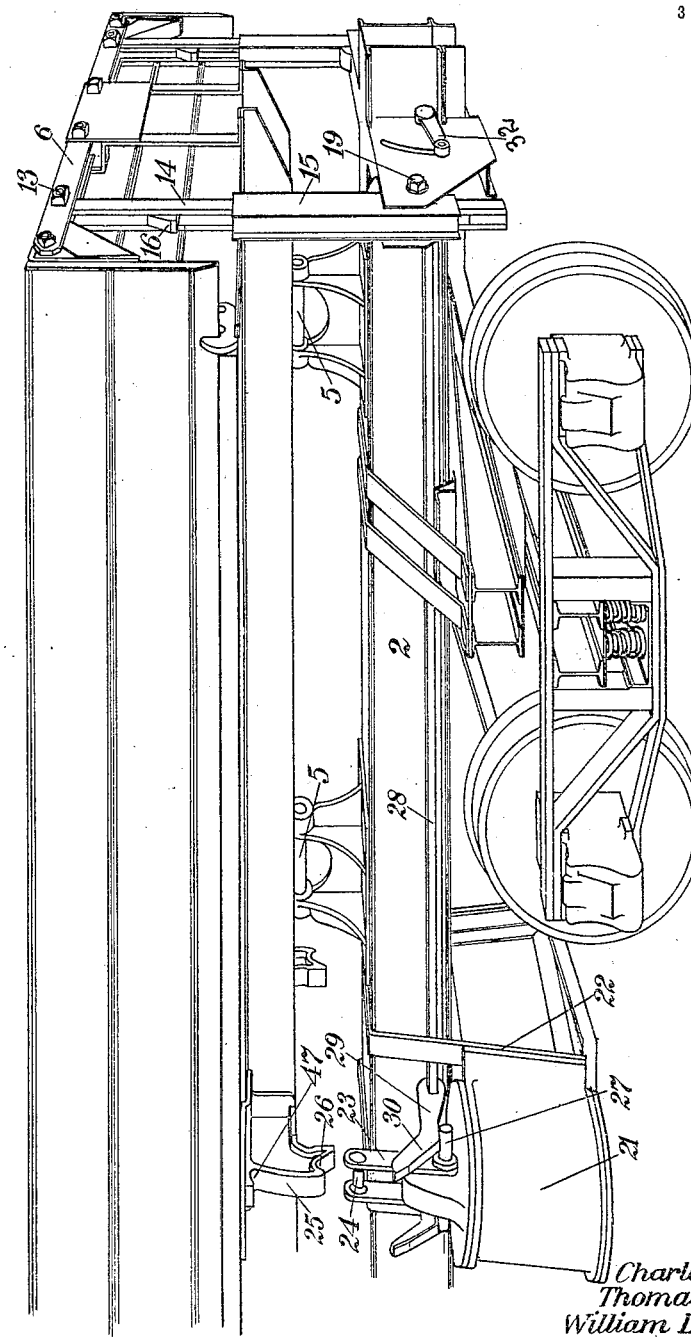

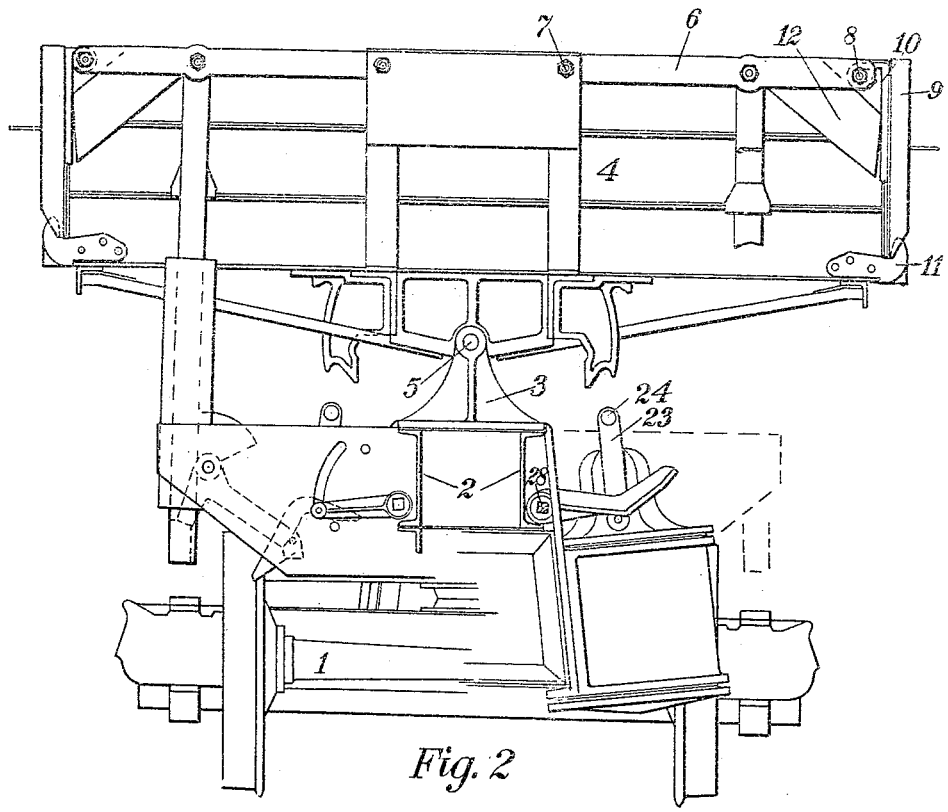
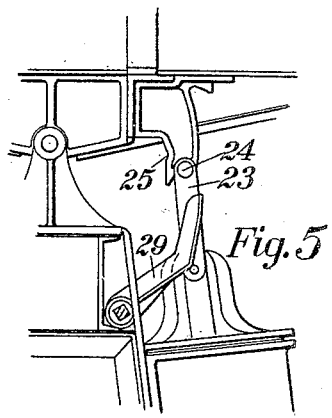
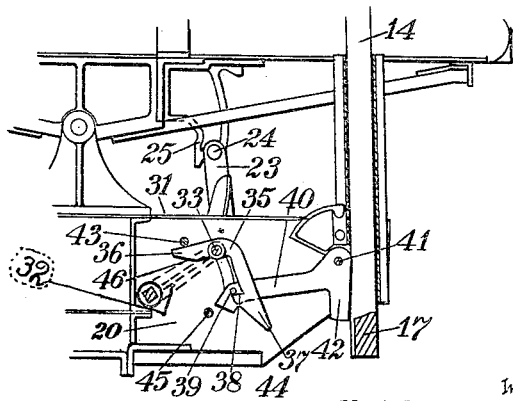

UNITED STATES PATENT OFFICE.

CHARLES H. DOTY, WILLIAM L. BURNER, AND THOMAS H. STAGG, OF COLUMBUS, OHIO, ASSIGNORS TO THE KILBOURNE AND JACOBS MANUFACTURING COMPANY, OF COLUMBUS, OHIO, A CORPORATION OF OHIO.

LOCKING DEVICE FOR DUMP-CARS.

No. 921,376.      Specification of Letters Patent.      Patented May 11, 1909.

Application filed February 3, 1908. Serial No. 413,975.

*To all whom it may concern:*

Be it known that we, CHARLES H. DOTY, WILLIAM L. BURNER, and THOMAS H. STAGG, citizens of the United States, residing at Columbus, in the county of Franklin and State of Ohio, have invented certain new and useful Improvements in Locking Devices for Dump-Cars, of which the following is a specification.

Our invention relates to improvements in locking means for a dump car, especially the type of car adapted to be dumped by the use of air; it is contemplated that the locking means should be so constructed as to be unlocked by the same movement of parts which dumps the car, and our improvement therefore consists in locking means which are automatically unlocked by the car dumping means on the side of the car which is elevated in dumping, while the locking means is undisturbed on the other side of the car, but remain in position and act as a stop for the further movement of the car box when the same is restored to its normal position; at the same time, the locking means which have been unlocked to elevate the side of the car, return to their normal position in time to engage the appropriate members on the car box when the latter is returned to its normal position, to relock the same.

Our improvements comprise the foregoing and other features and their combinations which will be hereinafter specifically declared.

In the drawings which are hereto attached and hereby made a part of this specification, Figure 1, is a perspective of a car showing our locking means in position and the connection between the same and the dumping means; Fig. 2 is an end view of a car provided with our locking means, one side thereof being broken away to disclose the dumping means; Fig. 3 is an end view of a car having our improvements thereon, in its dumped position; Fig. 4 is a detail showing the car operating means; Fig. 5 is a detail showing the connection between the dumping means and the locking means.

Referring to the drawings in which the same numeral indicates the same part throughout, 1 is a truck of a car, 2 is the center sill construction having mounted thereon at appropriate intervals brackets 3 supporting the car box 4 by means of the pivot pins or shafts 5, whereby the car box is adapted to swing laterally in either direction. At its ends the car box is provided with arms 6, pivoted at 7, to the outer end of which at 8 is pivotally hung the door 9 by means of the hinge connection 10; a hook 11 to engage the bottom of the door when in closed position is secured upon the car box adjacent the bottom thereof, so that when the car box is in its normal position, the door 9 is held against the lading by means of the hooks 11. Mounted on the arm 6 is a gusset plate 12 adapted to limit the inward swing of the door 9 when the latter is lifted out of engagement with the car, or in other words occupies its open position; by means of this gusset plate, the door 9 is constantly maintained in such position as to be returned with certainty to proper engagement with the hook 11 when the car box assumes its righted position.

Pivotally secured to the arm 6 at an appropriate point thereon at 13, is a depending arm 14, which at its lower end is inserted through the boxing 15, which serves both as a guide for the arm 14 and as a stop therefor, the latter function being effected by means of the lugs 16, appropriately positioned on the said arm 14, and projecting sufficiently to prevent their passing through the boxing 15, and by their engagement with the upper edge of the boxing 15, the arm 6 and consequently the door 9 are held in an elevated position, while the car box on that side descends to its dumped position. The depending arm 14 is preferably formed of two parallel members with the stop 17 formed between the same adjacent their lower ends, said stop being shown in dotted lines except in Fig. 4 where the same appears in section. The boxing 15 is provided with the extension or flange member 18 pivoted at 19 through the casing 20, whereby said boxing 15 may swing freely in a lateral direction, the swinging movement being imparted thereto by the travel of the arm 14 therethrough during the dumping movement of the car, said arm as appears in Fig. 3 moving both laterally of the boxing and transversely thereof during the dumping movement, and it is the transverse movement of the arm which rotates the box 15 on the pivot 19.

At 21 is shown a cylinder mounted upon the frame-work 22 and preferably carried beneath the car intermediate its ends; the piston of the cylinder carries thereon the links 23 having the pin connection 24 adjacent their ends adapted to engage the notched plate 25 secured to the under portion of the car body adjacent the center sill; the link members are shown in Fig. 4 in a raised position, the pin 24 being in contact with the notch 26 in the plate 25, the parts being properly engaged for the application of force to the car box to tilt the same; the same position of the parts is shown in Fig. 5. The link construction 23 adjacent its lower end carries the extending pin 27 for a purpose now to be explained.

The shaft 28 extends lengthwise of the car as shown in Fig. 1, and in section in Fig. 2, which shaft has rigidly mounted thereon the arm 29 having its outer portion curved as shown at 30, to form a cam face thereon adapted to be engaged by the pin 27; as said pin moves upwardly in dumping the car, it engages the cam face of the arm 29 thereby lifting said arm, whereby the shaft 28 is rotated, reaching the limit of its rotation when the parts are in the position shown in Fig. 3. When the piston retreats within the cylinder, the link members 23 are retracted and consequently the pin travels downwardly whereby the arm 29 is permitted to return to its normal horizontal position through gravity.

Mounted on the center sill adjacent the end of the car is the casing 20, having the cover plate 31 thereon whereby any of the material which may be carelessly or accidentally spilled in loading or unloading, is kept from contact with the locking means inclosed within said casing now to be described. Rigidly carried by the shaft 28 adjacent its end is an arm 32, which, as the shaft is rotated, will move upwardly and downwardly therewith; the arm 32 carries a a pin 33 inserted through the arc-shaped slot 34 in the casing 20, and having pivotally mounted upon its inner end the bent lever 35, which lever is consequently carried with the arm 32 as the latter is rotated by the shaft 28 as said shaft is caused to rotate through the construction above described. Lever 35 is provided with an arm 36 formed practically at a right angle with the other arm thereof 37; the arm 37 has formed thereon the hook 38 adapted to engage a pin on lever 40 pivoted at 41. As the arm 32 is lifted by the rotation of the arm 38 lever 35 is carried upwardly thereon, and the hook 38 engaging the pin 39, the long arm of the lever 40 is lifted upwardly, thereby rotating said lever 40 upon its pivot 41 and drawing short arm 42 of said lever out of engagement with the stop 17 formed adjacent the lower end of the arm 14, as shown in Fig. 4; the arm 14 is now free to be drawn upwardly, or in other words is unlocked. When the lever 35 reaches a desired elevated position, arm 36 thereof engages pin 43 provided on the inner face of the casing 20, and as the upward movement of the lever 35 is continued the effect of this engagement with pin 43 is to disengage the hook 38 from the pin 39 on the lever 40 as shown in Fig. 3, thereby permitting said lever 40 to return to its normal position by gravity. When the piston recedes, the arm 32 will return to its normal position carrying lever 35 therewith, and the cam face 44 thereof will pass over the pin 39, and the hook 38 will tend to reëngage the pin 39 when the lever 35 has been returned to its lowermost position; to assure engagement of the hook 38 with the pin 39 on the locking lever 40 a pin is provided on the inner face of the casing 20, with which the cam face 46 of the arm 36 of lever 35 engages, thereby causing said lever 35 to swing the hook end 38 inwardly to engage the pin 39, this operation being best shown in Fig. 2, in which the levers 35 and 40 are shown in dotted lines.

From the foregoing description it is seen that the locking of the arm 14 to hold the car box against tilting, and the unlocking thereof, is performed automatically by the movement of the piston in dumping the car and in receding to its normal position in the cylinder; consequently when it is desired to dump the car, all that is necessary is to apply the air to the appropriate cylinder, whereupon the unlocking takes place at the moment the dumping begins, and by the time the lading is deposited the piston has receded and the parts have all returned to their normal position ready to relock the car when the latter is returned to its normal position. Meanwhile on the lower side of the car, the locking means have been undisturbed and are consequently in proper position to act as a stop for the arm 14 when the car box has reached its normal horizontal position. The car is righted through the actuation of the piston on the side of the car upon which the lading was dumped, and in righting the car, the link construction 23 engages the notch 47 on the upper portion of the plate 25; the upward movement of the link construction due to the operation of the piston causes a rotation of the shaft 28 through the arm 29, and thereby the arm 32 is moved arcwise, whereby lever 35 is lifted, lifting lever 40 and withdrawing the short arm 42 out of the path of the stop 17 on the arm 14. But before the stop 17 has been lifted upwardly by the righting of the car to a point where it would engage the lever 40, said lever has been released through the engagement of the lever 35 with the pin 43, and said lever 40 has dropped to its normal position; therefore, although the locking lever 40 is moved on the dumped side of the car out of its normal position by the righting of the car, yet said locking lever has returned to locking position before the stop 17 is brought into position to engage therewith, so that when the car box has reached its normal horizontal position, the locking lever and stop on the arm 14 engage and prevent the car from tipping in the opposite direction. The locking means on the opposite sides of the car are so adjusted as to engage the depending arm 14 in a manner proper to maintain the car box 4 in a horizontal plane, and thereby obviate any unsteadiness or shifting of parts during the transportation.

The shaft 28, instead of being operated by the cylinder movement of the piston, may be formed for the reception of a wrench to be turned by hand to unlock the parts, if desired; although it is contemplated to be used in a car having automatic dumping means. However, in light cars it may be found advisable to operate said locking means by hand, and our invention is therefore intended to comprehend this manner of operation.

The drawings disclose what is deemed a preferable embodiment of our idea and its application to a car of the kind herein shown; it is not our intention to limit ourselves to the specific form of construction illustrated, but to claim all means for accomplishing the end proposed which are within the spirit of our invention.

What we claim is:

1. In a dump car, a car box, fluid operated means for dumping the same, a shaft adapted to be oscillated by said means, a member depending from said car box, and means connected with said shaft and adapted to be operated thereby to engage said member to lock the same against upward movement, and to be disengaged from said member to permit the same to move upwardly.

2. In a dump car, a car box, a fluid operated member adapted to be moved into engagement with said car box to dump the same, a member depending from said car box, a lever adapted to engage said member to lock the same against upward movement, a shaft adapted to be actuated by said fluid operated member, and connections between said shaft and said lever for unlocking the latter from said member.

3. In a dump car, a car box pivotally mounted, dumping means positioned on said car, a shaft adapted to be oscillated by said dumping means, an arm carried on said shaft, a lever pivotally carried by said arm, a member depending from said car box, a second lever pivotally mounted to engage said member to lock the same against movement in one direction, said first mentioned lever being adapted to engage said second lever for the purpose of unlocking said member when said car box is dumped.

4. In a dump car, a car box, means for dumping the same, a shaft adapted to be actuated by said dumping means, an arm carried by said shaft, a lever pivotally mounted on said arm, a second lever pivotally mounted, a member depending from said car box and adapted to be engaged by said second lever to be locked thereby, and means carried by said first lever for engaging said second lever to release the same from said member.

5. In a dump car, a car box, an air operated piston for dumping said car box, a member depending from said car box, a shaft, an arm on said shaft adapted to be rotated by said piston as the latter is actuated to dump said car box, a second arm on said shaft, and means connecting said second arm with said member to lock said member, said means being adapted to be moved out of locking position by the rotation of said shaft.

6. In a dump car, a car box, a fluid operated piston, a link carried by said piston to engage said car box to dump the same, a projection on said link, a shaft, an arm on said shaft adapted to be engaged by said projection to rotate said shaft, a member depending from said car, a pivoted lever adapted to engage said member, a second arm on said shaft, a pivoted lever carried by said arm and adapted to engage said first mentioned lever to lift the same out of its locking position at the beginning of the dumping movement of said piston.

7. In a dump car a car box, a member depending therefrom, an air operated piston for dumping said car, a link carried by said piston, a projection on said link, a shaft, an arm on said shaft adapted to be engaged by said projection when said piston is moved upwardly whereby said shaft is rotated, a second arm on said shaft, a pivoted lever carried thereon, a second pivoted lever adapted to engage said member to lock the same, and connections between said levers whereby when said shaft is rotated in one direction, said depending member is unlocked and thereby rendered free to move upwardly with the car box as the latter is dumped.

In testimony whereof we affix our signatures in the presence of two witnesses.

CHARLES H. DOTY.
WILLIAM L. BURNER.
THOMAS H. STAGG.

Witnesses:
ELIZABETH JENKINS,
GEO. W. RIGHTMIRE.